Feb. 9, 1971 M. D. TUPPER 3,561,202
SIDE SHARPENABLE CUTTERS
Original Filed Aug. 29, 1967 3 Sheets-Sheet 3

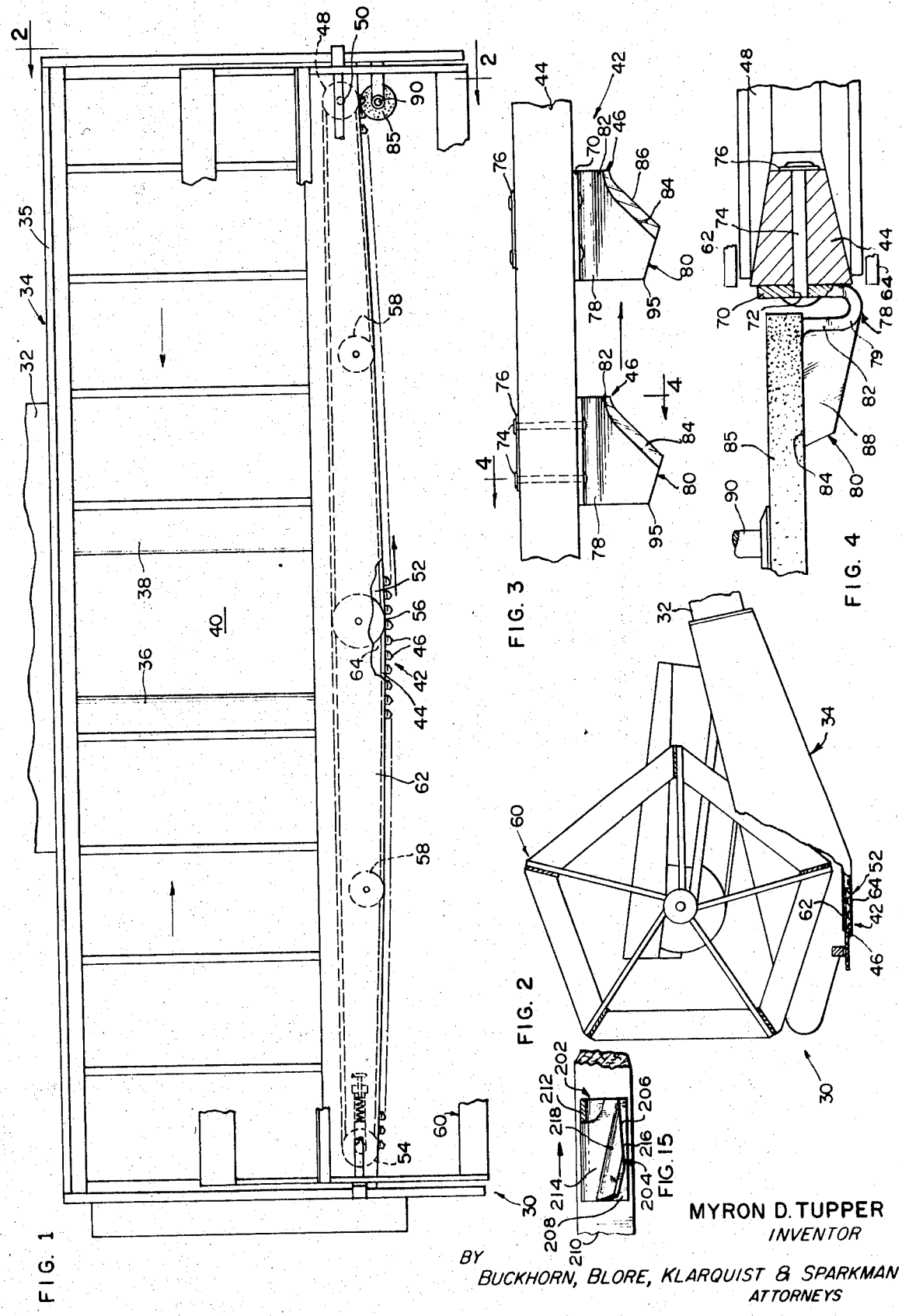

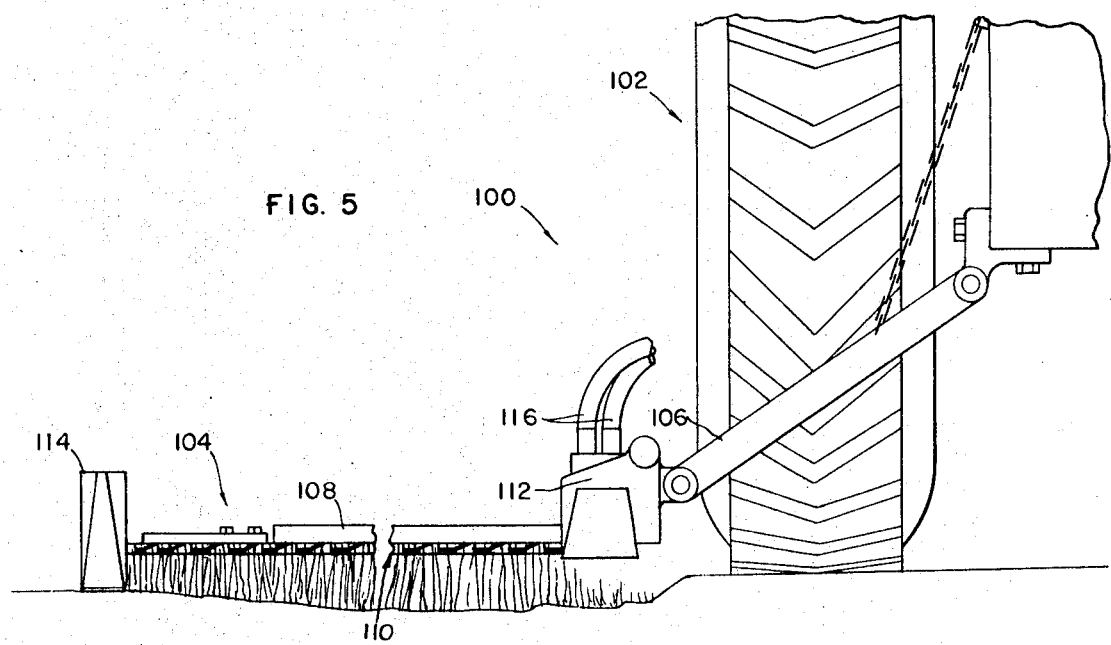
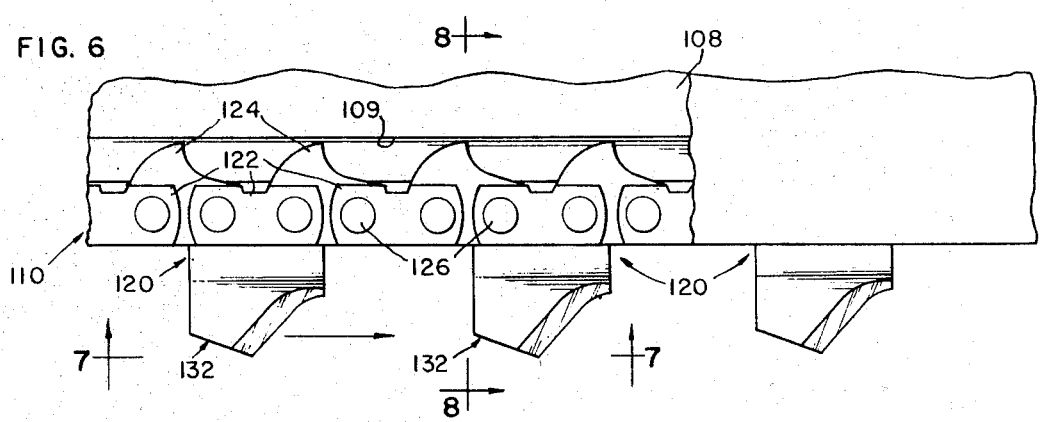
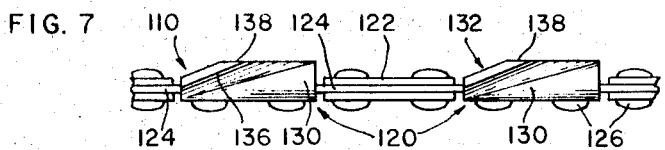
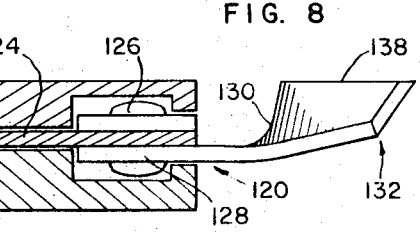
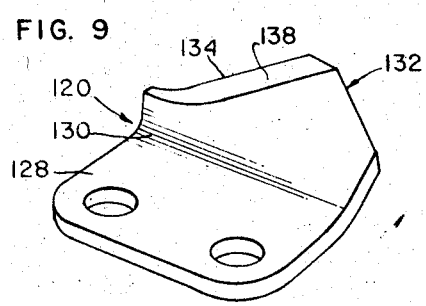

MYRON D. TUPPER
INVENTOR
BY
BUCKHORN, BLORE, KLARQUIST & SPARKMAN
ATTORNEYS

United States Patent Office 3,561,202
Patented Feb. 9, 1971

3,561,202
SIDE SHARPENABLE CUTTERS
Myron D. Tupper, Portland, Oreg., assignor to Omark Industries, Inc., Portland, Oreg., a corporation of Oregon
Continuation of application Ser. No. 664,054, Aug. 29, 1967. This application Feb. 6, 1970, Ser. No. 7,409
Int. Cl. A01d 55/24
U.S. Cl. 56—291
15 Claims

ABSTRACT OF THE DISCLOSURE

Side sharpenable cutters mounted in a cutting chain and on a belt for a mower and a cloth cutting machine, and sharpenable by annular, self-dressing abrasive members pushed against a forward end surface of a side cutter plate of each cutter as the cutter is advanced past the abrasive member. One form of cutter has the side cutter plate twisted so that the forward end is offset from the body and another cutter has the body so tilted relative to the belt that the side cutter plate extends angularly relative to the belt. A cloth cutting cutter has a cupped plate with the cutting edge at the rim. One cutter is mounted on a belt by rivets securing a body thereof to the belt.

The present application is a streamlined continuation of earlier filed application, Ser. No. 664,054, filed Aug. 29, 1967, and now abandoned.

DESCRIPTION

This invention relates to side sharpenable cutters, and more particularly to cutting machines having cutters which can be automatically sharpened.

Slicing or cutting cutters have been mounted on chains or belts in cutting machines such as mowers and cloth cutting machines and are quite effective when sharp. However, such cutters known hitherto have been difficult to sharpen, and have been heavy, expensive and complex in construction and difficult to maintain.

An object of the invention is to provide side-sharpening cutters.

Another object of the invention is to provide cutting machines having cutters which can be automatically sharpened.

A further object of the invention is to provide a cutter having a body attached to an endless carrier and also having a plate tilted laterally relative to the carrier and provided with a cutting edge defined by the intersection of the forward face and the forward end which is abradable to sharpen the cutting edge.

Another object of the invention is to provide a cutting machine having an endless carrier advanced past an abrading member and carrying cutters having cutting plates tilted forwardly and laterally relative to the carrier so that the forward end of the plate is moved across the abrading member to sharpen a cutting edge defined by the forward end and the forward face of the plate.

Another object of the invention is to provide a cutting chain including links of which some have bodies acting as links and tilted plates on the bodies extending forwardly and laterally of the chain with cutting edges defined by abradable end surfaces and forward faces of the plates.

A further object of the invention is to provide an endless cutting assembly having an endless belt carrier and cutters having bodies fixed to the carrier by riveting and also incdluding side plates tilted relative to the adjacent mounting portion of the carrier and having cutting edges defined by forward faces and abradable forward end surfaces thereof.

Another object of the invention is to provide a cutter for cutting cloth having a body secured to an endless carrier and a cutting portion secured to the body and cupped to provide an abradable rim surface and a cutting edge at the outer periphery of the rim.

The invention provides side sharpenable cutters and cutting machines including the side sharpenable cutters. The side sharpenable cutters may include bodies for mounting the cutters on a carrier, which may be a belt or chain, and cutter plates extending from the bodies and positioned in planes tilted relative to the adjacent portions of the carrier so that each cutting plate has an abradable forward end surface at one side of the path of the cutter plate and defining a cutting edge with a forward face of the cutter plate. An abrading member mounted at one side of the path may be pressed against the forward end surface to abrade it and sharpen the cutting edge. The body may be a link in the carrier if the latter is a chain or may be secured to a belt if the carrier is a belt. The cutter plate may be twisted relative to the body or may be bent at an angle relative to the body with the body secured to the carrier in a tilted position. A cloth cutting cutter forming one specific embodiment of the invention may include a link-like and a cupped cutter plate extending outwardly from the body and having its rim surface sharpenable to sharpen a cutting edge at the outer periphery of the rim.

A complete understanding of the invention may be obtained from the following detailed description of side sharpenable cutters forming specific embodiments thereof, when read in conjunction with the appended drawings, in which:

FIG. 1 is a fragmentary, top plan view of a cutting machine and side sharpenable cutters forming one specific embodiment of the invention;

FIG. 2 is a vertical sectional view taken along line 2—2 of FIG. 1;

FIG. 3 is an enlarged, fragmentary top plan view of a portion of the machine of FIG. 1;

FIG. 4 is an enlarged, vertical sectional view taken substantially along line 4—4 of FIG. 3;

FIG. 5 is a front elevation view of a cutting machine and side sharpenable cutters;

FIG. 6 is an enlarged, top plan view of a portion of the machine of FIG. 5;

FIG. 7 is an enlarged, front elevation view taken along line 7—7 of FIG. 6;

FIG. 8 is an enlarged vertical sectional view taken along line 8—8 of FIG. 6;

FIG. 9 is an enlarged, perspective view of a side sharpenable cutter of the machine of FIG. 5;

FIG. 15 is a front elevation view of a side sharpenable cutter forming an alternate embodiment of the invention.

Figure 13:
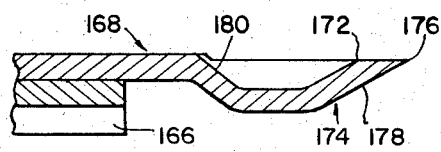
FIG. 13 is an enlarged, sectional view taken along line 13—13 of FIG. 12.

Referring now in detail to the drawings, there is shown in FIGS. 1 to 4 a vegetation cutting machine or mower 30 forming one embodiment of the invention, which, in the example shown, is a swather. The cutting machine includes a tractor 32 carrying at the front end thereof a swathing unit 34 including a frame 35 carrying slat conveyors 36 and 38 adapted to discharge mowed grass, hay or other mowed crop material through an opening 40 to form a swath. The swathing unit 34 has at the front end thereof an endless cutter assembly 42, which includes an endless V-belt 44 carrying cutter members 46 formed from sheet metal blanks. The V-belt is driven by a grooved drive pulley 48 keyed to a vertical shaft 50 journaled on a frame or saw bar 52 and driven by power from the tractor, and is entrained around the drive pulley, a spring-pressed, grooved end pulley 54, a grooved center idler pulley 56 and grooved intermediate idler pulleys 58, all of which are supported by the frame 52 for rotation on vertical axes. The center idler pulley 56 is larger in diameter than the other pulleys, and the pulleys are so mounted that the front course of the V-belt, which, of course, is the cutting portion, bows forwardly from the pulleys 48 and 54 to the center pulley 56. A reel 60 may be provided to sweep the crop material to be mowed into the advancing cutter assembly 42. Upper cover member 62 secured to the bar 52 covers the pulleys 48, 54, 56 and 58 and the V-belt, and a lower cover member 64 secured to the bar 52 covers the bottoms of the pulleys.

Each cutter member 46 is preferably formed from a sheet metal blank, and includes a vertical body 70 having a pair of rivet holes 72 (FIG. 4) through which extend rivets 74. The rivets and washers 76 secure the cutter members to the V-belt 44. A generally L-shaped shank 78 joined to the body 70 has an offsetting portion 79 and a shank portion 82 which lies in a plane preferably about 14° off from the vertical. A substantially planar side cutter plate 80 inclined relative to the horizontal is joined by a generally triangular, almost vertical offsetting plate 82 to the shank 78. A forward end surface 84 of the cutter plate is abradable by a sharpening member 85 to sharpen a cutting edge 86 at the juncture of the surface 84 and forward face 88 of the cutter plate 80. The surface 84 extends from forward face 88 to a rear face 89 of the cutter plate 80. The surface 84 is positioned at the side of the cutter assembly, and is side sharpenable as it is advanced past the sharpening member 85 when the latter has been pressed from a retracted position completely out of the path of the cutter plate 80 to a position engaging the surface 84. Preferably the member 85 is of wearable abrasive material, is annular in shape and of a width and position such that it is self-dressing from contact with the cutters and is mounted rotatably by a shaft 90 so that the member 85 is rotated by the cutter members 46 and is dressed thereby. All the surfaces 84 lie in the same plane which is parallel to, and, to provide the most balanced reaction forces from mowing, is shown in the same plane as that in which lies the pitch line of the V-belt 44. While the cutter plates 80 extend rearwardly and downwardly, cutters having cutter plates extending upwardly and rearwardly from the cutting edges may be substituted therefor. The length of the portion of the member adjacent the path of the surfaces 84 should be sufficiently great and the spacing of the surfaces 84 from each other is sufficiently close that, during sharpening, the member spans at least two of the surfaces 84 and is always in engagement with at least one of the surfaces 84. The cutters 46 preferably are composed of steel with at least the face 88 being chromium plated to make the cutting edge 86 hard and durable. Preferably, the portion 82 joins the shank 78 at a slightly obtuse angle and the plate 80 joins the portion 82 at a greater obtuse angle so that, since the grinding is effected in a plane parallel to the shank 79, the cutting edge 86 slopes rearwardly relative to the direction of advancement of the cutter 46. Each plate 80 lies in a plane inclined at an angle of about 18° relative to the horizontal when the surface 84 lies in a horizontal plane. The cutting edge 86 preferably makes an angle of about 39° with the pitch line of the chain. The plate 80 is effective even when sharpened substantially completely down to outer rear corner 95 thereof.

EMBODIMENT OF FIGS. 5 TO 11

A cutting machine 100 (FIGS. 5 to 11) forming an alternate embodiment of the invention includes a tractor 102 and a side mowing attachment 104 pivotally mounted on the tractor by a frame linkage 106 between a horizontally extending mowing position and an upright retracted or storage position. The attachment includes a laminated bar 108 having a groove 109 guiding an endless cutter assembly or cutting chain 110, which is driven by a drive sprocket (not shown) mounted directly below and driven by a hydraulic motor 112. A guide sprocket (not shown) is mounted at the outer end of the guide bar, and a shoe or skid 114 is carried by that end of the guide bar. Power is supplied to the motor 112 through flexible conduits 116 connected to a hydraulic pump (not shown) on the tractor and under the control of the driver of the tractor.

The chain 110 (FIGS. 6 and 7) includes cutter links 120, side links 122, and center drive links 124, which project into the groove 109 in the guide bar 108. Rivets 126 secure the side links and bodies 128 of the cutter links 120 pivotally to the center drive links. The bodies 128 are substantially wider than the side links to position generally triangular offsetting or shank portions 130 and side cutter plates 132 outwardly from the loop of the chain, the chain lying in a horizontal plane when the attachment is in its mowing position as shown in FIG. 5.

Each cutter link 120 is formed by bending a sheet metal blank to form the offsetting portion 130 (FIGS. 6 to 9) and the cutter plate 132. The cutter plate and the offsetting portion are, in effect, a twisted continuation of the planar body of the cutter link. The offsetting portion is planar and the cutter plate is planar and is relative to the plane of the body, tilted laterally upwardly proceeding forwardly from the rear end of the cutter plate. Each offsetting portion forms a slightly obtuse angle with the body and each cutter plate forms a substantially larger obtuse angle with the offsetting portion so that the cutter plate is tilted laterally upwardly proceeding from the offsetting portion. This causes a cutting edge 134, which is formed at the juncture of a forward face 136 and a forward end sharpening surface 138 lying in a horizontal plane, to extend rearwardly and outwardly relative to the pitch line of the chain. When desired, a shaft 140 (FIG. 11) carrying an annular sharpening member or stone 142 of abrasive material is pressed downwardly, as viewed in FIG. 11, to bring annular face 144 thereof into engagement with the surfaces 138 to abrade the surfaces 138, as they are advanced with the chain past the member 142, to sharpen the cutting edges 134. Preferably, the sharpening member 142 is positioned so as to engage the cutter links just before the cutter links come to the drive sprocket or while the cutter links are on the drive sprocket so that drag of the cutter links therebehind prevents any slack in the portion of the chain just approaching the drive sprocket. Also, the guide bar or the sprocket supports the portion of the chain being engaged by the sharpening member against the lateral force against that portion of the chain from the sharpening member. The member 142 is rotated either by the shaft 140 or by permitting the chain to rotate it, and this effects dressing of the surface 144. Also, the surface 144 is of a width and is so positioned relative to the path of the surfaces 138, the extremities of which path are indicated by broken lines 146 and 148 (FIG. 10), that outer periphery 150 of the surface 144 extends beyond the line 146 and inner periphery 152 of the surface 144 extends into the path. This insures sharpening the entire surfaces 138 and dressing of the surface 144 completely thereacross as the member 142 is rotated and the chain is advanced.

The cutter links 120 are shown as bottom links with the cutter plates tilted upwardly and rearwardly from the cutting edges 134. Instead of the cutter links 120, similar top cutter links having rearwardly and upwardly sloping cutter plates may be used.

EMBODIMENT OF FIGS. 12 TO 14

Figure 14:
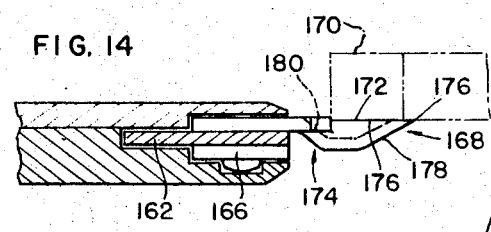
FIG. 14 is a section taken along line 14—14 of FIG. 12.
Figure 12:
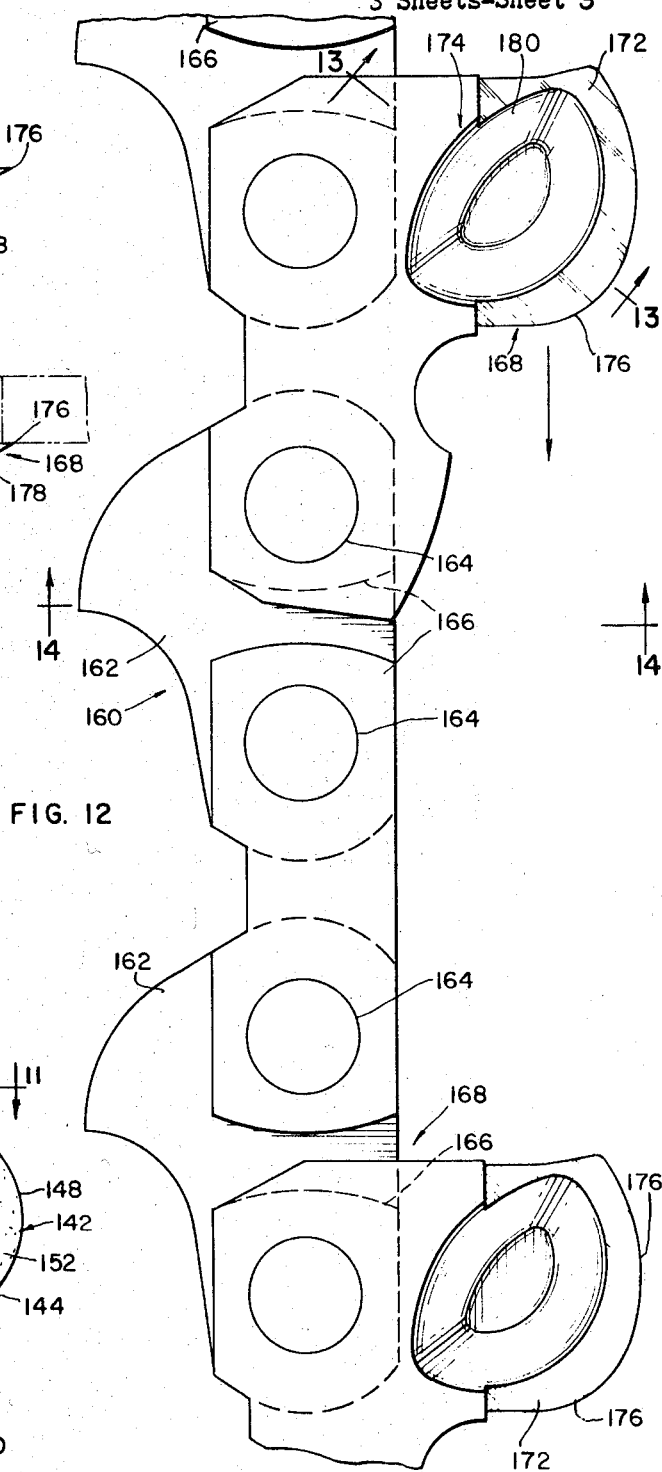
FIG. 12 is a side elevation view of a cloth cutting chain forming an alternate embodiment of the invention.
Figure 10:
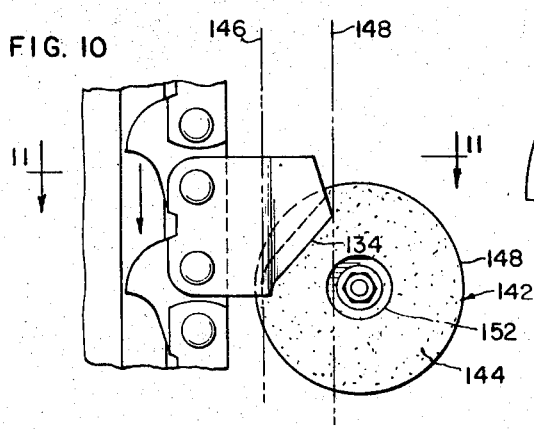
FIG. 10 is an enlarged, fragmentary, bottom plan view of a portion of the machine of FIG. 5.
Figure 11:
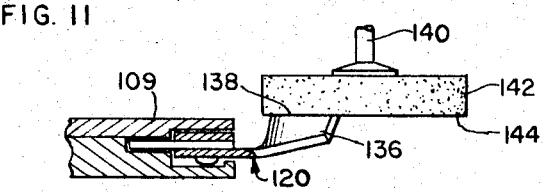
FIG. 11 is an enlarged fragmentary vertical sectional view taken along line 11—11 of FIG. 10.

A cutter assembly or chain 160 of a cloth cutting machine and forming an alternate embodiment of the invention includes center drive links 162 secured by rivets 164 to side links 166 and side-sharpenable cutter links 168. The chain is driven by a drive sprocket (not shown), travels around an idler sprocket (not shown), and is power sharpened when an abrasive sharpening member 170 is pressed sidewise relative to the chain into engagement with an edge or rim surface 172 of a cupped cutter portion 174 of each cutter link. This sharpens cutting edges 176 defined by the surfaces 172 and frustoconical outer surfaces 178 of the cupped cutter portions 174 of the cutter links 168. In order to make the entire depth of the cupped cutter portion sharpenable, the surface 172 is always sharpened to the right of inner portion 180 of the inner surface of the cupped cutter portion, as viewed in FIGS. 13 and 14. Each link 168 is formed from a sheet metal blank preferably of steel with the outer surface 178 chrome plated so that the edge 176 is hard and durable.

EMBODIMENT OF FIG. 15

A side sharpenable endless cutter assembly 200 forming an alternate embodiment of the invention is like the cutter assembly 42 except that cutter members 202 are inverted 180° as compared to the cutter members 46 so that side plates 204 of the cutter members 202 slope upwardly and rearwardly from cutting edges 206 which has been found to be desirable for certain vegetation cutting operations. The cutter members 202 otherwise are like the cutter members 46, and each cutter member 202 has a body 208 secured to the outer face of an endless V-belt 210 by rivets, an offsetting shank portion 212 and a substantially vertical shank portion 214. The side plate 204 is joined to and forms a continuation of the shank portion 214, and is tilted somewhat downwardly to cause the cutting edge 206 to be swept back proceeding outwardly from the shank portion 214. This gives a slicing action to aid the impact cutting effected by the cutting member, which is advanced at a high rate of speed, of at least 3,000 feet per minute up to 10,000 or greater feet per minute. The side plate has a downwardly facing, side sharpenable forward end surface 216 which preferably is in a horizontal plane and is sharpened by advancing the surface over an abrasive member (not shown) like the abrasive member 85 but mounted below the cutter members 202 and movable upwardly into engagement with the surfaces 216 when it is desired to sharpen the cutting edges. Each of the cutter members 202, like each of the cutter members 46, 120 and 168, is formed completely from a single sheet metal blank. The cutting edge 206 is defined by the intersection of forward face 218 of the side plate 204 and the end surface 216.

The side plate 204 is inclined to the horizontal at an angle preferably of not substantially less than 40° and preferably not substantially greater than 50°. By having the inclination not substantially less than 40°, more sharpenings may be obtained and the edge 206 is less easily dulled than if this angle were substantially less than 40°. By having the angle not substantially greater than 50°, the cutting edge 206 is kept quite acute.

The above-described cutting machines and the side sharpenable cutter assemblies are highly effective for mowing and cutting. The cutter assemblies are light in weight and can be driven at high speeds such as to cut several times as fast as conventional mowers. For example, the cutter assemblies are adapted to be moved forwardly through heavy crop material at speeds of over ten miles per hour, the cutter assemblies being advanced at speeds of 4,000 feet per minute. The cutters have large widths which may be sharpened and still be effective, and have quite acute but durable cutting edges.

It is to be understood that the above-described arrangements are simply illustrative of the application of the principles of the invention. Numerous other arrangements may be readily devised by those skilled in the art which will embody the principles of the invention and fall within the spirit and scope thereof.

I claim:
1. In a cutting device:
   an endless carrier member lying in and movable forwardly in a predetermined direction along a predetermined endless path in a predetermined plane,
   the carrier member being movable as a whole in a direction of advancement which is primarily transversely of said path,
   a plurality of cutter members attached to the carrier member at spaced points therealong,
   each cutter member including a body portion attached to the carrier member and a cutting plate,
   each cutting plate having a portion lying in a second plane inclined to said predetermined plane and inclined to the adjacent portion of said path about an axis primarily parallel to said predetermined plane and intersecting said path at a substantial angle to said path,
   each cutting plate including a forward face, a rear face and a forward edge surface,
   the forward edge surface lying in a plane substantially parallel to the adjacent portion of said path and extending rearwardly from the forward face to the rear face and forming an acute angle with the forward face to define a cutting edge,
   the forward edge surface being primarily parallel to said predetermined plane thereby constituting an extreme of the cutting plate so that the forward edge surface can be moved past an abrasive member without contact between other portions of the cutter member and the abrasive member,
   the edge surface and the cutting edge being in their entireties to one side of said path and extending predominantly in said direction of advancement.
2. The cutting device of claim 1 wherein the carrier member comprises an endless belt,
   and means for attaching the body portions of the cutter members to the belt.
3. The cutting device of claim 1 wherein said axis is substantially perpendicular to the adjacent portion of said path.
4. The cutting device of claim 1 wherein the forward edge surface lies in a plane parallel to said predetermined plane.
5. The cutting device of claim 1 wherein the cutting edge lies in a plane parallel to said direction of advancement.
6. In a cutting device:
   an endless carrier member,
   a cutter body adapted to be attached to the endless carrier and be moved along a predetermined path,
   and a cutting plate attached to the body and movable by the carrier member past an abrading member in a forward direction,
   the cutting plate being tilted relative to said direction and having a forward face, a rear face and a forward end surface extending from the forward face to the rear face and intersecting the forward face at an acute angle to define therewith an acute cutting edge,
   the cutting plate being concave at its forward end so that the cutting edge is curved.
7. The cutter of claim 6 wherein the portion of the forward face forming the cutting edge is convex.
8. The cutter of claim 6 wherein the cutting plate is cupped.
9. In a cutting machine including a plurality of cutters and carrier means adapted to move the cutters forwardly along an endless path in a predetermined direction and in a predetermined plane, each cutter comprising:
   a body portion attached to the carrier means,
   and a side plate integral with the body portion and lying in a second plane tilted relative to said predetermined plane about an axis primarily parallel to said predetermined plane lying in said second plane so a forward face of the side plate faces forwardly in the direction of movement and extends laterally of said endless path, the side plate having a forward end surface at the lateral extreme of the side plate, the forward end surface extending from the forward face of the side plate to the rear face thereof and forming a cutting edge with the forward face of the side plate, whereby the forward end surface is primarily parallel to said predetermined plane thereby constituting an extreme which can be abraded as the cutter is advanced past a sharpening member at the side of said path to sharpen the cutting edge.

10. In a cutter:

a cutting plate having a forward face, a rear face and a tip end surface at the forward end thereof joining the forward face and the rear face and lying in a predetermined plane intersecting the forward face at an acute angle to define an acute cutting edge, a plate-like, planar body having fastening means, and a shank portion forming a continuation of and connecting together one edge of the body and one edge of the cutting plate and mounting the cutting plate in a position relative to the body in which the forward and rear faces of the cutting plate lie in planes inclined relative to and extending forwardly and laterally relative to the body, the cutter having no portions both intersecting the plane of the tip end surface and positioned forwardly or rearwardly of the tip end surface so that the tip end surface can be freely moved over a sharpening surface.

11. The cutter of claim 10 wherein the tip end surface is substantially parallel to the plane of the body.

12. In a cutter for a cutting chain:

a plate-like, planar link body having a pitch line and fastening means, a shank joined at one edge to one edge of the link body, forming a continuation of the link body and extending substantially at right angles to the link body, and a planar cutting plate joined at one edge to one edge of the shank, forming a continuation of the shank and extending forwardly relative to the intended travel of the cutter and laterally outwardly relative to the link body, the cutting plate having parallel forward and rear faces and a tip edge surface extending between the forward ends of the forward and rear faces and defining with the forward face a cutting edge, the plane of the cutting plate intersecting the plane of the link body along a line forming an acute angle with said pitch line of the link body and intersecting said pitch line at a point forwardly of the link body so that, proceeding from the forward end of the cutting edge, the cutting edge extends rearwardly and away from the link body, the cutter having no obstructions forwardly or rearwardly of the tip edge surface so that the tip edge surface can be moved parallel to the pitch line freely past a sharpening member.

13. In a side sharpening chain:

a plurality of side links, a plurality of center drive links, a plurality of cutter links having side link body portions and cutting plate portions forwardly and laterally inclined relative to the link body portions having forward edge surface portions parallel to the body portions and forming cutting edges with forward faces of the cutting plate portions, and a plurality of fasteners connecting to the center drive links the side links and the side link body portions in pairs bracketing the center drive links with all the cutter links on the same side of the center drive links and all of the cutting plate portions extending from the same side of the side link body portions, all of the cutting plate portions extending forwardly and toward the side of the chain opposite to said side of the center drive links.

14. In combination:

an endless chain having a predetermined pitch line and including drive links, connecting links and cutter links, means for advancing the chain forwardly along a predetermined path in a predetermined plane, each cutter link including a body portion attached to the chain and a planar cutting plate lying in a second plane inclined to said predetermined plane and extending sidewise from the chain and outwardly from the adjacent portion of the chain and forwardly, each cutting plate including a forward face and a rear face, each cutting plate also including a sharpenable edge surface lying in a plane at one side and extending between the forward face and the rear face and forming an acute cutting edge with the forward face, and a sharpening member having a sharpening surface and movable from a retracted position at one side of said path into engagement with the forward edge surfaces of the cutting plates to sharpen the cutting edges as the cutting plates are advanced therepast, the sharpenable edge surface being the only portion of the chain which contacts the sharpening member when the chain is advanced along said path.

15. The combination of claim 14 wherein the forward edge surfaces of the cutting plates lie in a plane substantially parallel to said plane of said path of the chain.

References Cited

UNITED STATES PATENTS

| 1,615,288 | 1/1927 | Maimin | 30—139 |
| 2,295,654 | 9/1942 | Gury | 30—139 |
| 2,488,886 | 11/1949 | Young | 56—291 |
| 2,539,199 | 1/1951 | Murray | 56—244 |
| 2,744,376 | 5/1956 | Miner | 56—244 |
| 2,782,582 | 2/1957 | McClearen | 56—244X |
| 3,034,276 | 5/1962 | Hester | 56—291 |
| 3,043,079 | 7/1962 | Aston | 56—290 |
| 3,106,053 | 10/1963 | Fairbairn | 56—291 |

FOREIGN PATENTS

| 6,403,851 | 1965 | Netherlands. |

LOUIS G. MANCENE, Primary Examiner

J. N. ESKOVITZ, Assistant Examiner

U.S. Cl. X.R.

56—245

PO-1050
(5/69)

UNITED STATES PATENT OFFICE
CERTIFICATE OF CORRECTION

Patent No. 3,561,202          Dated February 9, 1971

Inventor(s)    Myron O. Tupper

It is certified that error appears in the above-identified patent and that said Letters Patent are hereby corrected as shown below:

Column 2, line 24, after "link-like" insert --body--. Column lines 57 thru 59, "144. Also the surface 144 is of a width is so positioned chain to rotate it, and this effects dressi of the surface" should read --chain to rotate it, and this e fects dressing of the surface 144. Also, the surface 144 is a width and is so positioned--.

Signed and sealed this 29th day of June 1971.

(SEAL)
Attest:

EDWARD M. FLETCHER, JR.          WILLIAM E. SCHUYLER, J
Attesting Officer          Commissioner of Patent